G. L. BERG.
GUIDING APPARATUS FOR AUTOMOBILE LAMPS.
APPLICATION FILED JAN. 22, 1912.
1,053,938. Patented Feb. 18, 1913.
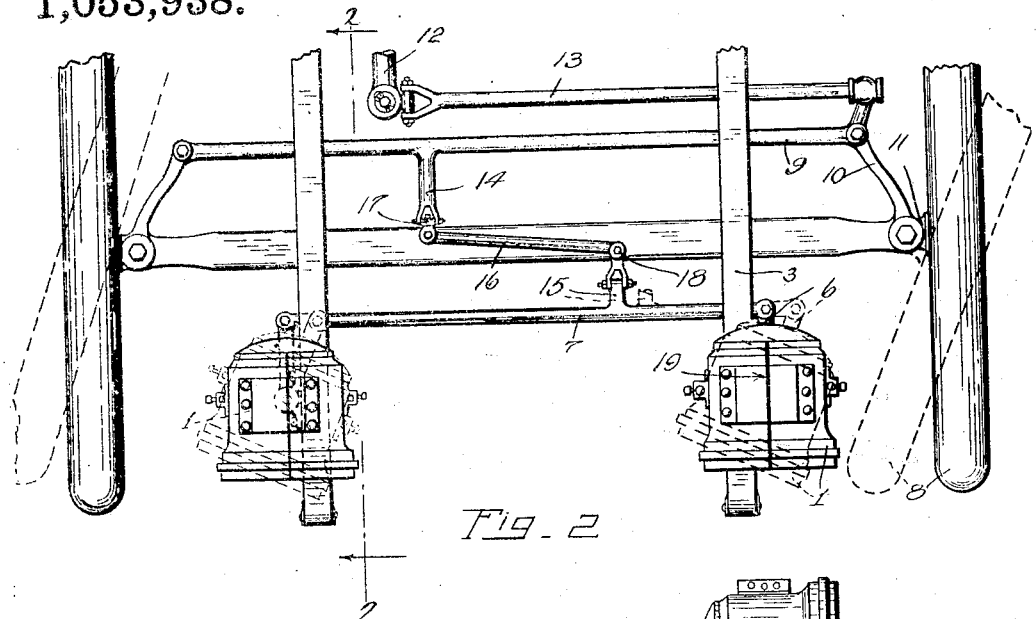
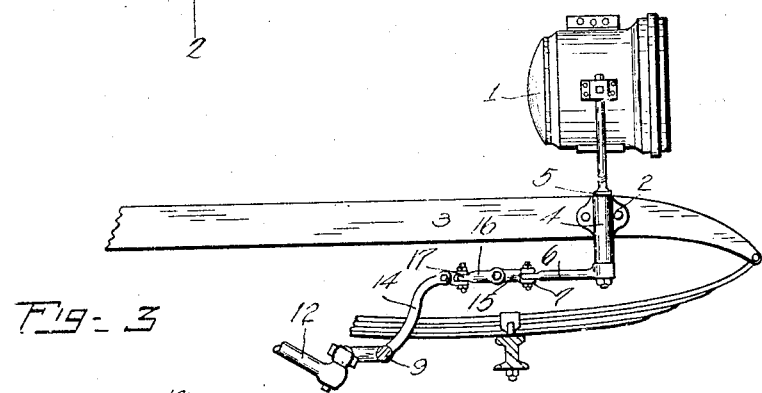
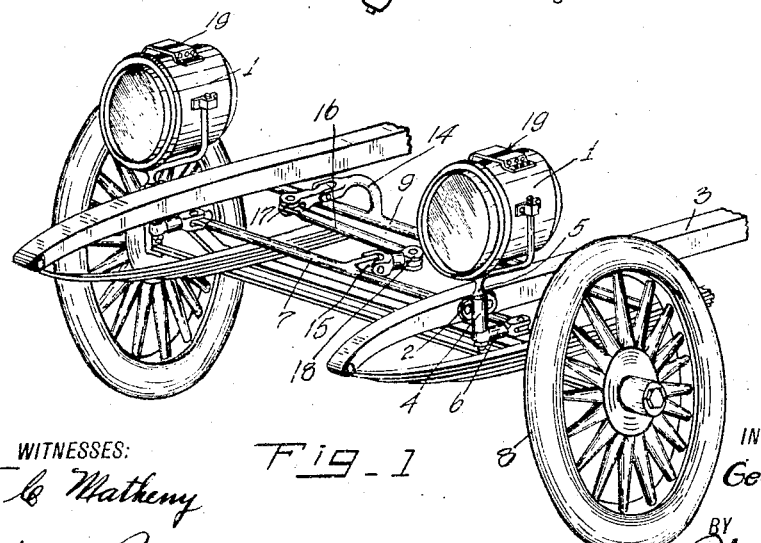
WITNESSES:
F. C. Matheny
Horace Barnes
INVENTOR
George L. Berg
BY
Pierre Barnes
ATTORNEY

UNITED STATES PATENT OFFICE.

GEORGE L. BERG, OF SEATTLE, WASHINGTON.

GUIDING APPARATUS FOR AUTOMOBILE-LAMPS.

1,053,938.   Specification of Letters Patent.   Patented Feb. 18, 1913.

Application filed January 22, 1912. Serial No. 672,631.

*To all whom it may concern:*

Be it known that I, GEORGE L. BERG, a citizen of the United States, residing at Seattle, in the county of King and State of Washington, have invented certain new and useful Improvements in Guiding Apparatus for Automobile-Lamps, of which the following is a specification.

This invention relates to improvements in apparatus for mounting lamps or headlights of automobiles and other vehicles.

A fertile source of accidents resides in the practice of rigidly mounting the headlights of a car upon the car-body in such a manner that their light illuminates only a path in the direction of the axis of the car and tangent to the course being pursued by the steering wheels.

Particularly in cars having a long chassis the deviation of the light from the true direction in which the car is moving is considerable and is objectionable as not serving as an efficient light to guide the person steering the car and is apt to confuse the steerer of an adjacent car as to the course to be taken to avoid an accident.

The object of my invention is the provision of improved means to automatically adjust the beam of light projected by the headlamps of a car to illumine the curved path in which the steering wheels are guiding the vehicle when turning a corner or deviating from a line parallel with the axis of the car-body.

A further advantage residing in my arrangement of the lamps of a car is that the lamps at all times indicate the direction in which the steering wheels are positioned and when said wheels are out of sight of the steerer, as behind mud-guards or obscured through the structure of the car-body it is very necessary to thus indicate their position.

A still further advantage of my improvement consists in enabling the head-light to be thrown upon an object at one side of the road, as a sign-board, by simply turning the front wheels of the car.

The invention consists in the novel construction, adaptation and combination, of parts, as will be hereinafter fully described in the following specification, illustrated in the accompanying drawings, and finally set forth in the appended claim.

In said drawings, Figure 1 is a perspective view of apparatus embodying my invention shown in operative position upon a car. Fig. 2 is a plan view of the same. Fig. 3 is a cross sectional view through 3—3 of Fig. 2.

Referring to said drawings, the reference numeral 1 designates a pair of head-light lamps which may be mounted upon a relatively fixed portion of the car-body or chassis. As shown, a plate 2 is rigidly secured to a longitudinal frame-member 3 of the car and includes integrally a vertically arranged barrel 4 in which the spindle 5 of the respective lamp is journaled. The lower end of each said spindle is rigidly connected with a lever 6 which is hingedly connected in parallel relation at its opposite end to a tie-rod 7 adapted to influence both said lamps in unison.

The front wheels 8 are steered in unison through tie-bar 9 which is connected at its opposite ends to steering arms 10 which are rigidly connected to the steering heads 11. Control by the operator of said steering devices is had in a suitable manner, as through lever 12 operatively connected with the steering wheel and connecting bar 13 secured to said tie-bar 9. Said tie-bar 9 is operatively connected to communicate corresponding lateral movements to tie-rod 7. The tie-bar is provided with a forwardly protruding branch 14 while the tie-rod 7 is formed with a rearwardly projecting lug 15; said branch and lug being positioned desirably upon opposite sides of the longitudinal axis of the car and terminating in proximity of a line parallel to the transverse axis of the car. Said branch 14 is formed with an upward curvature that raises its forward end approximately in a plane horizontal with the rear extremity of lug 15. A connecting rod 16 connects the respective forward and rear ends of said branch and lug by duplex pivotal joints 17, 18 at its opposite ends. Such joints extend to maintain said rod in practically parallel relation to the minor or transverse axis of the car and accommodate any relative vertical or longitudinal movement between said branch and lug. As indicated, rod 16 is arranged substantially horizontal and is desirably of sufficient length upon opposite sides of the major axis of the car to render such relative vertical or horizontal movements between its ends of small moment.

The operation of the device is believed to be clearly evident from the foregoing. It should be noted, however, that the efficiency of the present invention resides to a large extent in the relatively flexible yet positive connections between parallel tie-members 7 and 9. It will be readily apparent that any relative movement of the running-gear except lateral to which the tie-bar 9 is attached will be absorbed by said connections without effect upon the supported devices to which the tie-rod 7 is secured, and conversely. Thus pitching or rolling of the body of the car will have no effect upon the operative relations of said parallel members. All lateral motion of the wheels as communicated by the steering-gear or otherwise, coincidentally affects the lamps through said means. The horizontal axis of said lamps will thus be parallel to the direction in which said wheels are positioned, as shown in dotted lines in Fig. 2, and therefore also parallel to the course in which the vehicle is proceeding. As the lamps move pivotally about their vertical axes and are maintained in parallel with said wheels no danger is experienced of their interfering even in their most extreme positions. To facilitate the added function with which the lamps are endowed, that is to say, as an indicator of the direction in which the wheels are turned and which is in view when the wheels are not visible, by reason of being hid from observation from the automobile seat by reason of the mud guards or other parts of the automobile, the top of each of the lamps is provided with a medially positioned axial dark line 19 positioned upon a plane parallel with the longitudinal axis of the automobile.

While I have described the illustrated embodiment of my invention with some detail, it is evident that various modifications may be made within the scope of the claim without departing from the spirit of the invention or sacrificing its advantages.

Having described my invention, what I claim as new and desire to secure by Letters-Patent, is—

In a device of the class described, the combination with the steering wheels of an automobile, and a connecting tie bar therefor, said tie bar having a forwardly-projecting upwardly curved branch, of a pair of lamps pivotally-mounted upon the car, a tie rod in parallel relation with said tie bar positioned thereabove and connecting said lamps to move in unison and having a rearwardly-projecting lug, said branch and lug being upon opposite sides of the longitudinal axis of the car, two duplex pivotal joints, one of said joints connected to the free end of said lug and the other joint connected to the free end of said branch, and a rod operatively connected at its opposite ends to the extremities of said pivotal joints substantially parallel with said tie bar and tie rod.

Signed at Seattle, Wash., this 12th day of Jan., 1912.

GEORGE L. BERG.

Witnesses:
 HORACE BARNES,
 E. PETERSON.